J. A. BACHMAN.
COTTON TRAMPER.
APPLICATION FILED JUNE 24, 1919.

1,412,824.

Patented Apr. 18, 1922.
3 SHEETS—SHEET 1.

INVENTOR:
Joseph A. Bachman
By Attorneys,

J. A. BACHMAN.
COTTON TRAMPER.
APPLICATION FILED JUNE 24, 1919.

1,412,824.

Patented Apr. 18, 1922.
3 SHEETS—SHEET 2.

INVENTOR:
Joseph A. Bachman
By Attorneys,
Fraser, Funk & Meyers

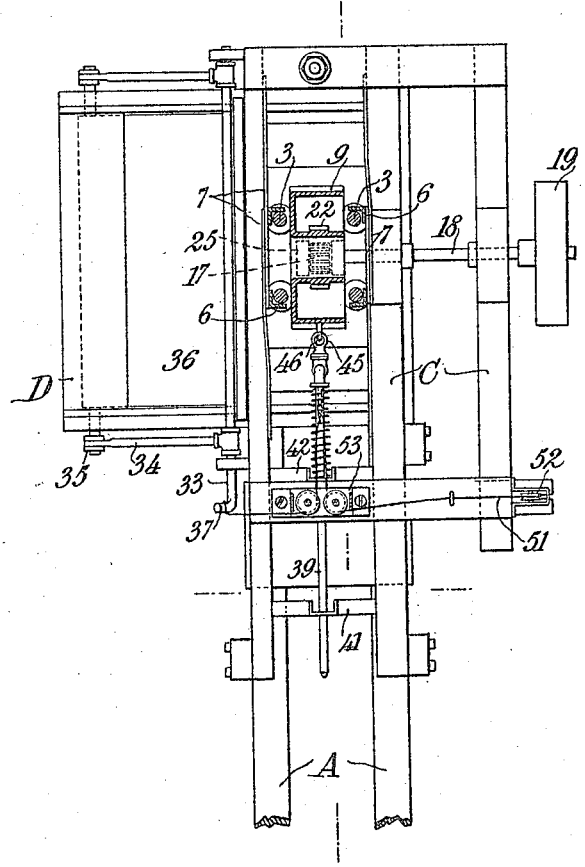

UNITED STATES PATENT OFFICE.

JOSEPH A. BACHMAN, OF AUSTIN, TEXAS.

COTTON TRAMPER.

1,412,824. Specification of Letters Patent. Patented Apr. 18, 1922.

Application filed June 24, 1919. Serial No. 306,350.

*To all whom it may concern:*

Be it known that I, JOSEPH A. BACHMAN, a citizen of the United States of America, residing in the city of Austin, county of Travis, and State of Texas, have invented certain new and useful Improvements in Cotton Trampers, of which the following is a specification.

This invention relates to improvements in trampers such as are commonly employed in conjunction with baling presses for cotton, and aims to provide improvements therein.

The present invention provides a tramper which is mechanical in its operation, which is simple in construction, which involves but few working parts, and which is efficient in operation.

The invention further provides certain features of combination between the tramper per se and a swinging part of a slide upon which the cotton is supplied to the underside of the tramper.

Other features of improvement will be hereinafter set forth.

An embodiment of the invention is illustrated in the accompanying drawing.

In said drawing Fig. 1 is a view, partly in elevation and partly in section, of said embodiment of the invention, together with certain parts of a cotton press to which the invention is applied.

Fig. 4 is a sectional view on the line IV—IV, Fig. 1.

Figure 1:
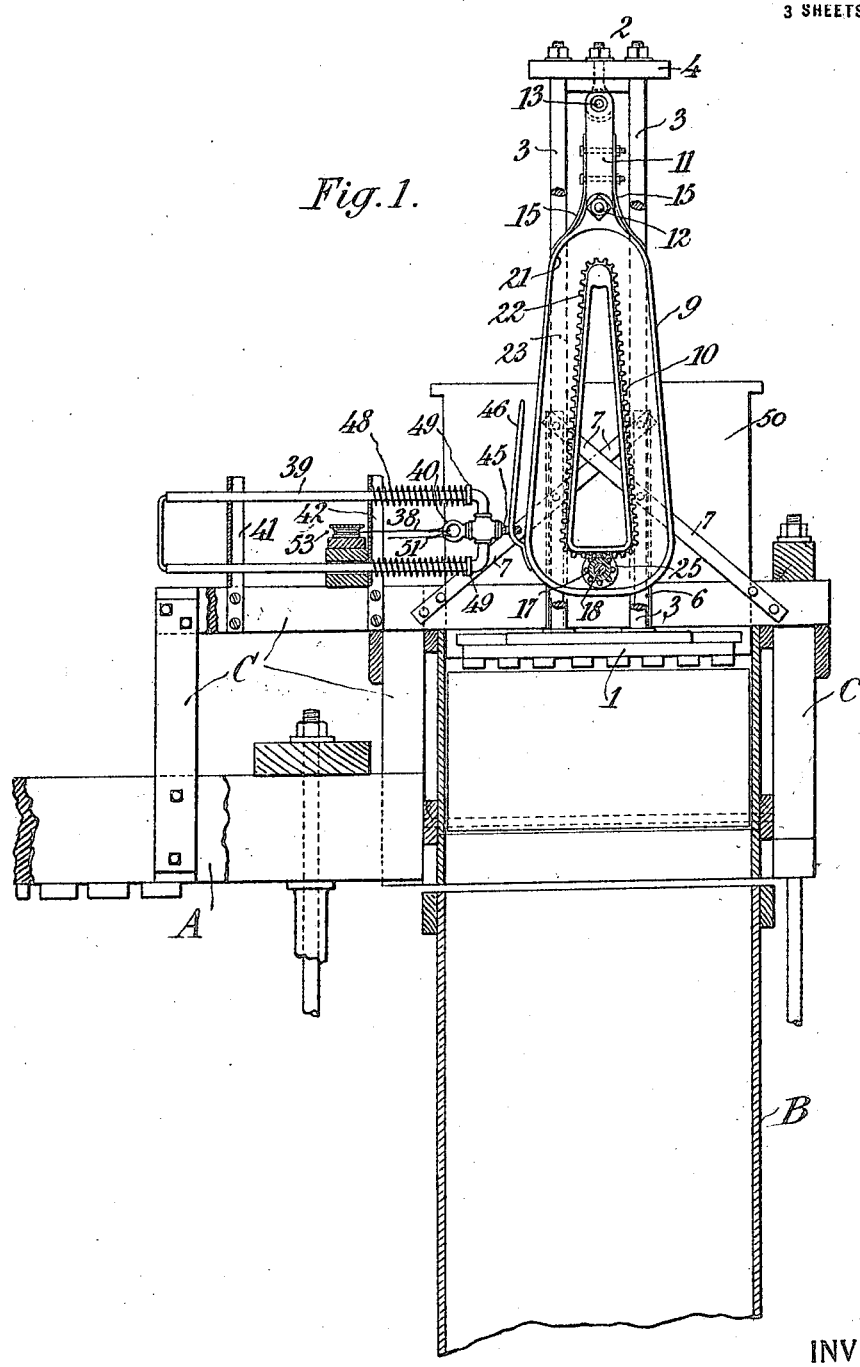
Figure 2:
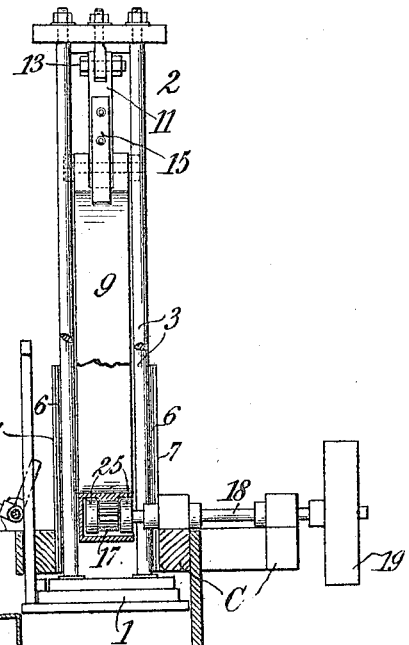
Fig. 2 is a sectional view on the line II—II, Fig. 1.

In said drawing letter A designates certain parts of the frame of a cotton press, B a baling box, and C a framework for supporting the tramper in a position above the baling box. D indicates a slide upon which cotton moves or slides into the baling box, and into a position beneath the tramper. The usual practice is to gin the cotton, condense the lint in a machine called a condenser, and bale this ginned cotton or lint in the baling press, the ginned cotton or lint sliding into the baling press on the slide D.

The tramper comprises a reciprocatory part or plunger which comprises a follower 1 and an upright frame 2 thereon formed conveniently of four upright posts 3 connected at their upper ends by a block 4. The framework C is provided with a guide 6 for the tramper, this guide being conveniently composed of four pieces of angle-iron arranged in such manner as to contact with the upright posts 3. Braces 7 may be provided for the angle-iron guide 6.

Numeral 9 designates a triangular rack comprising gear teeth 10 and attached to the plunger by the link 11, the link being pivotally connected to the gear, as indicated at 12, and being also pivotally connected to the block 4 of the plunger as indicated at 13.

Leaf-springs 15—15, attached to the link 11 and bearing upon the triangular rack piece 9 are provided for stiffening the joint between said rack and link, for a purpose to be hereinafter explained. The rack is actuated by a pinion 17 fast upon the shaft 18 journaled upon the frame-work C, and rotated in any suitable manner, as by means of a pulley 19. Means are provided for keeping the teeth upon the pinion in mesh with the teeth 10 of the rack, these means being preferably the walls 21 and 22 of a channel 23 formed in the rack piece 9, and having a contour similar to that of the rack. Rollers 25, loose upon the pinion shaft 18 maintain the teeth upon the pinion in mesh with the teeth upon the rack. Preferably a roller 25 on each side of the pinion is employed, and while preferred and desirable, it is not necessary to provide the wall 22 of the channel as a surface against which the rollers 25 may contact. The wall 22, however, in conjunction with the rollers 25 serves to provide a clearance between the ends of the teeth upon the pinion and the base of the teeth upon the rack.

Figure 3:
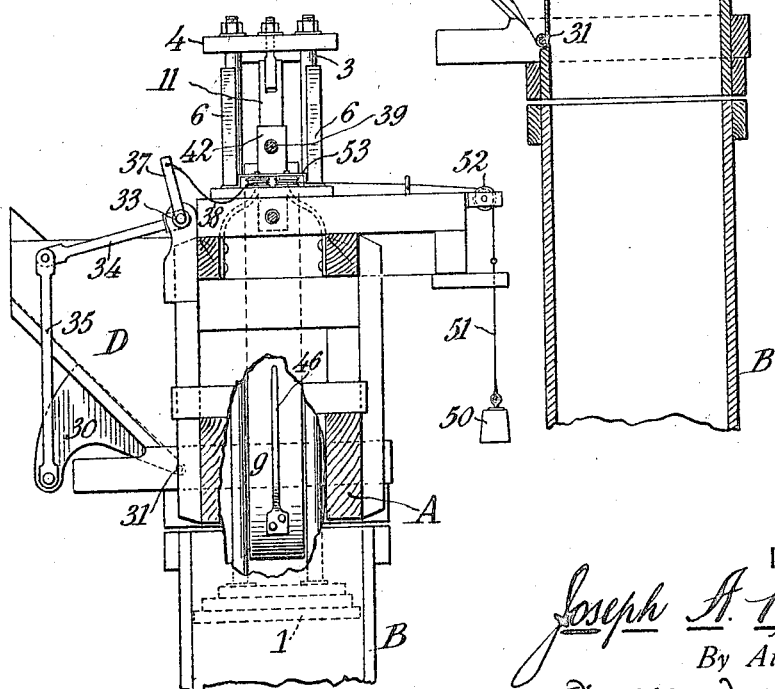
Fig. 3 is a side elevation with parts broken away and with the tramper in a position different from that in Fig. 2.

The slide D which is preferably used in conjunction with the tramper is provided with a swinging part 30, turning about a shaft 31 journaled upon a convenient part of the framework C. A rock-shaft 33 is preferably provided for actuating the swinging part 30, being connected thereto by an arm 34 and a link 35. The rock-shaft 33 may be operated by any suitable means, but is preferably actuated by, and in timed relation to the tramper. To this end suitable connections are provided between the rockshaft 33 and the plunger of the tramper. The rock-shaft 33 may have a rock-arm 37 thereon to which is attached one end of a flexible cable 38, or the like, the other end of which is conveniently attached to a slide-frame 39, as indicated at 40. 41 and 42 designate supports for the slide-frame 39. The slide-frame and rack-piece 9 are provided with interengaging clutch parts, the frame 39 being conveniently provided with an eye 45, and the rack-piece 9 with an elongated finger 46. The position of the frame 39 for engagement of the finger 46 with the eye 45 is determined by a suitable stop or stops, these being preferably resilient springs 48 bearing at one end against shoulders 49 upon the frame, and at the other end upon a fixed part, as for example one of the supports 42. The spring stops 48 are normally drawn against the parts 42 by suitable means, for example a weight 50, Fig. 3, the weight 50 being conveniently connected to the frame by means of a cable 51 passing over pulleys 52 and 53. In order to prevent the stream of cotton flowing down the slide D preventing the return of the swinging part 30, said part 30 is preferably provided at its back with a curved apron 36 which fits closely against the end of the stationary part of the slide.

Operation: Cotton to be baled is put into the baling box B. When the press is used in conjunction with a condensing machine the cotton slides in a substantially continuous stream down the slide D into the baling box. When the baling box is filled with loose cotton, it is desirable to compact it, and for this purpose the tramper is used. A belt being connected to the pulley 19, the pinion 17 imparts movement to the rack 9. During the filling of the baling box the plunger of the tramper is normally in its highest position. The pinion 17 therefore moves the rack downwardly, carrying with it the follower 1. By reason of the link 11 the rack-piece 9 may be displaced to one side or the other of the pinion axis, according to which side of the rack is in mesh with the pinion. When the rack reaches the lower end of its movement, its apex passes under the pinion 17, and the pinion 17 thereupon engages the teeth on the other side of the triangle, thus raising the follower 1 until the follower reaches its highest position. The pinion then engages the teeth upon the base of the triangular rack, thus providing a dwell of the follower during the time that the teeth of the base of the rack are moving over the pinion. The springs 15 act to stiffen the joint between the triangular gear 9 and link 11, so as to prevent the triangular gear 9 from toppling sidewise when the base of said triangular gear is traveling across the pinion 17. The springs 15 are, however, not essential. In this interval while the follower is raised, more cotton may be put into the baling box beneath the follower, and thereupon the action of the pinion on the rack causes the plunger carrying the follower 1 to repeat the previous reciprocation.

When the slide D with swinging part 30 is used in connection with the tramper, the finger 46 engages the eye 45 during a part of the upward movement of the rack-piece 9, the frame 39 carrying the eye piece 45 being properly positioned by the action of the weight 50 and the resilient stops 48 to bring about the clutching or engaging of the parts 45, 46. During the remainder of the upward movement of the rack-piece 9, the finger 46 simply passes idly through the eye 45. When the rack-piece 9 reaches the limit of its upward movement and the pinion 17 engages the base of the triangular rack, the frame 39 is pulled by the rack-piece 9 against the pull of the weight 50. The frame 39, when moved by the rack-piece 9, also pulls upon the cable 38 attached to the rock-arm 37 upon the rock-shaft 33, but inasmuch as a certain amount of slack is provided in the cable 38 (see Fig. 3) the cable 38 is not drawn taut until the latter part of the movement of the base part of the rack over the pinion 17. When, however, the cable 38 is drawn taut, and pulled upon the rack-piece 9, the rock-shaft 33 is rocked, swinging upwardly the part 30 of the slide to a position alongside the follower 1, and the swinging part 30 is maintained in this position until, upon the downward movement of the rack-piece 9, the finger 46 is disengaged from the eye 45. Upon the disengagement of the parts 45 and 46 the weight 50 serves to slide the frame 39 in a direction away from the rack-piece 9, thereby slackening the cable 38 and allowing the swinging part 30 to swing back to a position flush with the slide D. By the time the swinging part 30 is released the follower 1 has descended a considerable part of its movement, and has preferably reached a position about on a level with the shaft 31 upon which the swinging part 30 turns.

The reciprocation of the plunger and the intermittent action of the swinging part through the clutching of the parts 45, 46 continue, in the same manner as described, until the baling box has been filled and compacted to the point where it is desirable to transfer the baling box to the place where the compacted cotton is subjected to great pressure and bound in bales.

The swinging part 30 has the beneficial action of separating the stream or flow of cotton down the slide D and fulling or piling up the cotton under the follower 1 of the plunger, so that the plunger does not have a shearing action upon the cotton flowing into the baling box, and so that there is no loss of motion of the follower 1 in traveling from its uppermost position to the top of the heap of cotton beneath it at the top of the baling box. If it is desired to operate the tramper independently of the swinging part 30, this may be done by pulling upon the frame 39 against the action of the resilient stops 48, thereby withdrawing the eye 45 out of position to be engaged by the finger 46 upon the upward movement of the rack-piece 9.

A slide 50, traveling with the head 1 prevents cotton falling on top of the head 1 during the time said head is lowered.

The inventive ideas as herein set forth are capable of receiving other embodiments than those herein specifically illustrated and described.

What is claimed is:—

1. A cotton tramper for baling presses, comprising a follower, means for reciprocating said follower, said means comprising a triangular gear, a pinion, and a connection between said gear and follower, said rack being arranged so that the base of said triangular rack travels over said pinion when the follower is in elevated position, whereby a dwell is produced in the motion of said follower in its up, or withdrawn, position.

2. A cotton tramper for baling presses, comprising a follower, means for reciprocating said follower, said means comprising a triangular gear and a link connecting said triangular gear to said follower, a pinion meshing with said gear, and a guide for maintaining said gear and pinion in mesh, said rack being arranged so that the base of said triangular rack travels over said pinion when the follower is in elevated position, whereby a dwell is produced in the motion of said follower in its up, or withdrawn, position.

3. A cotton tramper for baling presses, comprising a follower and frame, means for reciprocating said follower, said means comprising a triangular gear and a link connecting said triangular gear to said follower frame, a pinion meshing with said gear, and a guide for maintaining said gear and pinion in mesh, said guide comprising a channeled part around said gear and rollers in conjunction with said pinion.

4. A cotton tramper for baling presses, comprising a follower and frame, means for reciprocating said follower, said means comprising a triangular gear and a link connecting said triangular gear to said follower frame, a pinion meshing with said gear, a shaft carrying said pinion, a guide for maintaining said gear and pinion in mesh, said guide comprising a channeled part around said gear, and loose rollers mounted on said pinion shaft.

5. A cotton tramper for baling presses, comprising a follower and frame, means for reciprocating said follower, said means comprising a triangular gear and a link connecting said triangular gear to said follower frame, a resilient means opposing the bending of the joint between said frame and link.

6. In combination, a follower and a cotton slide having a swinging part adapted to be swung to and from a position alongside said follower, and means for swinging said swinging part in conjunction with the movement of said follower, said means comprising a transmission, and means on said follower intermittently connecting and disconnecting with said transmission.

7. In combination, a follower and a cotton slide having a swinging part adapted to be swung to and from a position alongside said follower and means for swinging said swinging part in conjunction with the movement of said follower, said means comprising a transmission having a lost motion therein, and means on said follower intermittently connecting and disconnecting with said transmission.

8. A cotton tramper for baling presses, comprising a follower and frame, means for reciprocating said follower, said means comprising a triangular gear, a link connecting said triangular gear to said follower frame, and a pinion meshing with said gear, a cotton slide having a swinging part adapted to be swung to and from a position alongside said follower, and means for swinging said swinging part in conjunction with the movement of said follower, said means comprising a transmission and clutching parts upon said triangular frame and transmission, respectively, said clutching parts being adapted to engage during the upward part of said reciprocation of said triangular gear, said transmission being caused to act upon said swinging part by the oscillation of said triangular gear produced by the meshing of said pinion with the base part of said triangular gear, and said clutching parts being disengaged during the downward reciprocation of said triangular gear and follower.

9. A device according to claim 8, said transmission comprising a sliding frame, a flexible cable and a lever between said cable and swinging part of the slide.

10. A device according to claim 8, further comprising means for returning the swinging slide part after said transmission is disconnected from said gear.

11. A device according to claim 8, further comprising means for removing said clutch parts from interengaging position.

12. A device according to claim 8, further comprising a sliding frame having one of the clutch parts thereon, a resilient stop for said frame, and means for displacing said frame, tensioning said resilient stops and removing the clutch part thereon out of position to be engaged by the clutch part on said gear.

13. In a press a ram, a triangular rack, gearing between the ram and the triangular rack, and means for driving the triangular rack.

14. In a press a ram, a triangular rack, a shaft mounted in bearings, a pinion on the shaft in mesh with the rack, guides on the rack, rollers carried by the bearings running on the guides.

In witness whereof, I have hereunto signed my name.

JOSEPH A. BACHMAN.